(12) United States Patent
Yamamoto et al.

(10) Patent No.: US 6,837,618 B1
(45) Date of Patent: Jan. 4, 2005

(54) ELECTRONIC THERMOMETER (75) Inventors: Tetsuya Yamamoto, Tanashi (JP); Yasushi Tsukamoto, Tanashi (JP)

(73) Assignee: Citizen Watch Co., Ltd., Tokyo (JP)

(*) Notice: Subject to any disclaimer, the term of this patent is extended or adjusted under 35 U.S.C. 154(b) by 0 days.

(21) Appl. No.: 09/700,449

(22) PCT Filed: Mar. 10, 2000

(86) PCT No.: PCT/JP00/01463
§ 371 (c)(1),
(2), (4) Date: Nov. 9, 2000

(87) PCT Pub. No.: WO00/54015
PCT Pub. Date: Sep. 14, 2000

(30) Foreign Application Priority Data

Mar. 11, 1999 (JP) .............................................. 11/64809

(51) Int. Cl.⁷ .............................. G01K 7/00; G01K 1/00
(52) U.S. Cl. ........................ 374/163; 374/208; 374/170
(58) Field of Search ................................. 374/163, 208, 374/170; 377/25, 54, 64

(56) References Cited

U.S. PATENT DOCUMENTS

| | | | | |
|---|---|---|---|---|
| 3,582,554 A | * | 6/1971 | Le Blang .................... 179/2 DP |
| 3,622,768 A | * | 11/1971 | Clark et al. ................... 235/160 |
| 3,651,694 A | * | 3/1972 | Lamb ............................ 73/342 |
| 3,978,471 A | * | 8/1976 | Kelly ............................ 324/104 |
| 4,009,615 A | * | 3/1977 | Ruhl ........................ 73/362 AR |
| 4,090,064 A | * | 5/1978 | Turner ..................... 235/92 MT |
| 4,105,902 A | * | 8/1978 | Iwai et al. ...................... 307/308 |
| 4,114,447 A | * | 9/1978 | Creach .............. 340/166 EL X |
| 4,181,957 A | * | 1/1980 | Pinckaers ..................... 700/278 |
| 4,218,916 A | * | 8/1980 | Mutziger ................... 73/359 R |
| 4,225,932 A | * | 9/1980 | Hirano et al. ............... 364/710 |
| 4,298,947 A | * | 11/1981 | Tamura et al. ............... 364/557 |
| 4,406,550 A | * | 9/1983 | Gray ........................... 374/110 |
| 4,423,963 A | * | 1/1984 | Suzuki ......................... 368/68 |
| 4,565,456 A | * | 1/1986 | Iida et al. ..................... 374/169 |
| 4,634,292 A | * | 1/1987 | Ikeda et al. .................. 374/109 |
| 4,688,029 A | * | 8/1987 | Kawasaki et al. ........... 340/754 |
| 4,690,532 A | * | 9/1987 | Kawamura et al. ..... 354/171.11 |
| 4,730,941 A | * | 3/1988 | Levine et al. ................ 374/170 |
| 4,771,791 A | * | 9/1988 | Kubouchi .................... 128/736 |
| 4,774,697 A | * | 9/1988 | Aihara ......................... 368/41 |
| 4,878,184 A | * | 10/1989 | Okada et al. ................ 364/557 |
| 4,988,995 A | * | 1/1991 | Buisson et al. .............. 340/971 |
| 5,332,886 A | * | 7/1994 | Schilling et al. ............ 219/506 |
| 5,638,308 A | * | 6/1997 | Stokes ................... 364/709.01 |

FOREIGN PATENT DOCUMENTS

| | | | | |
|---|---|---|---|---|
| DE | 4123895 | * | 1/1993 | ........... G02B/27/22 |
| JP | 97539 | | 7/1980 | |
| JP | 81027 | | 5/1987 | |

* cited by examiner

Primary Examiner—Gail Verbitsky
(74) Attorney, Agent, or Firm—Fay, Sharpe, Fagan, Minnich & McKee, LLP (57) ABSTRACT

An electronic thermometer includes a display device for displaying a temperature of an associated object under temperature measurement in a predetermined display digit number. A temperature measurement device generates a temperature measurement signal based on the temperature of the associated object. A computation device is provided for computing a temperature value of a digit number larger than the predetermined display digit number to be displayed on the display device on the basis of the temperature measurement signal. A control device controls the display device to display a first temperature value portion and a second temperature value portion. The first portion is displayed with a first set of predetermined digits and the second portion is displayed with a second set of predetermined digits, including any digit or digits other than the first predetermined digits.

18 Claims, 9 Drawing Sheets

ELECTRONIC THERMOMETER

TECHNICAL FIELD

The present invention relates to an electronic thermometer such as a clinical thermometer of emission type.

BACKGROUND ART

Electronic thermometers such as a thermometer for measuring temperature of water or air and a clinical thermometer for measuring a body temperature by selecting an armpit, oral cavity, ear canal, and the like of a human body as a measurement site have heretofore been proposed. In the thermometer for measuring the water or air temperature, and the clinical thermometer for measuring the body temperature by the armpit or the oral cavity of the human body use temperature sensors such as a thermistor are used. Moreover, in the clinical thermometer which uses the ear canal as the measurement site, infrared sensors such as a thermopile are used as a sensor for detecting infrared radiation from the ear canal.

Generally, there is a dispersion in individual electric characteristics in the sensors such as the thermistor and thermopile used in the electronic thermometers, and therefore outputs of which individual sensors need to be adjusted in order to constitute a thermometer with a predetermined precision.

To solve the problem, the present applicant has proposed PCT/JP98/04260 in a clinical thermometer of emission type in which output of the thermistor or the infrared sensor is adjustable. In the emission type clinical thermometer infrared radiation from an object to be measured is guided by a light guide tube, the radiation in detected by infrared sensor (first infrared sensor), the temperature of the infrared sensor is measured with a temperature-sensitive sensor (first temperature-sensitive sensor), and by using a second infrared sensor and second and third temperature-sensitive an influence of a temperature difference between the light guide tube and the infrared sensor is compensated for by using a second infrared sensor and second and third temperature-sensitive sensors, so that the temperature of an object whose temperature is to be measured is obtained. There is provided adjustment means to adjust respective outputs of the first and the second infrared sensors and the first to the third temperature-sensitive sensors. A higher-precision emission type clinical thermometer is provided by adjusting the dispersion of the electric characteristics of each sensor with the adjustment means in a manufacturing process.

As described above, in recent years, such higher-precision clinical thermometers have been demanded. In order to provide the clinical thermometer with a higher precision, even a value of a digit lower in order than a digit number displayed as a body temperature to a user of the thermometer needs to be adjusted within a predetermined range. For example, in a clinical thermometer designed to display the body temperature to a 1/10 digit value, the digit value of 1/100 of the body temperature is adjusted within the predetermined range.

However, there are problems that, in order to confirm whether or not the value of the digit lower in order than the digit number displayed as the body temperature to the user of the thermometer is adjusted in the predetermined range a special display which is able to display even the value of the digit lower than that on the main body of the clinical thermometer is used in the manufacturing process, separately from a display on the main body of the clinical thermometer, and that the number of digits of the display on the main body of the clinical thermometer has to be increased to obtain the lower digit which is not usually displayed. There are necessary only for adjustment in the manufacturing process, and cause an increase in a product cost.

Moreover, in case where the number of digits necessary for display differs for usual use and special use and the number of display digits necessary for the usual use which is required more frequently is smaller than the number of display digits necessary for the special use which is required less frequently, a display section needs to be constituted and adapted for the larger number of digits notwithstanding the fact that the frequency of use is low.

For example, in the clinical thermometer, three-digit display such as 37.2° C. is sufficient in a general clinical thermometer. However, four-digit display such as 37.24° C. is required for a clinical thermometer for women' use to record a periodical subtle change of the body temperature. Therefore, if the same clinical thermometer is used both for the general clinical thermometer and the clinical thermometer for women's use a four-digit display section is necessary, although a three-digit display section is sufficient for the usual use. This causes an increase in cost. Therefore, a clinical thermometer which can display a four-digit temperature using the three-digit display section is demanded.

It is an object of the present invention to solve the aforementioned problem, and to provide an electronic thermometer which is able to display all information to be displayed using a display section having a digit number smaller than that of the all information to be displayed.

DISCLOSURE OF THE INVENTION

According to one aspect of the present invention, an electronic thermometer includes temperature measurement means for generating a temperature measurement signal based on a temperature of an object under temperature measurement; computation means for computing the temperature of the object in a predetermined computation digit number based on the temperature measurement signal; display means for displaying the temperature computed by the computation means in a predetermined display digit number; and digit shift means for changing a display digit of the temperature computed by the computation means for displaying on the display means.

According to another aspect of the present invention, the predetermined computation digit number of the computation means is larger than the predetermined display digit number of the display means, and the digit shift means switches first display for displaying upper digits of the predetermined computation digit number computed by the computation means, and second display for displaying lower digits of the predetermined computation digit number computed by the computation means.

According to another aspect of the present invention, the digit shift means alternately switches the first display and second display.

According to another aspect of the present invention, the digit shift means selects either one of the first display and the second display.

According to another aspect of the present invention, the display means includes a plurality of decimal point display sections for displaying a decimal point, and the digit shift means switches a position of the decimal point between the first display and the second display.

According to another aspect of the present invention, the display means includes only one decimal point display section, the decimal point display section is turned on in the first display, while the decimal point display section is turned off in the second display.

According to another aspect of the present invention, the electronic thermometer is an electronic clinical thermometer for measuring a body temperature, the computation means computes the body temperature in Centigrade four digits from a digit of 10 to a digit of 1/100, the predetermined display digit number of the display means is three digits, and the digit shift means displays upper three digits of the Centigrade four digits in the first display, and displays lower three digits of the Centigrade four digits in the second display.

According to another aspect of the present invention, the electronic thermometer is an electronic clinical thermometer for measuring a body temperature, the computation means computes the body temperature in Centigrade four digits of a digit of 10 to a digit of 1/100, the predetermined display digit number of the display means is three digits, and the digit shift means displays upper three digits of the Centigrade four digits in the first display, and displays lower one digit of the Centigrade four digits in the second display.

According to another aspect of the present invention, the electronic thermometer is an electronic clinical thermometer for measuring a body temperature, the computation means computes the body temperature in Fahrenheit five digits from a digit of 100 to a digit of 1/100, the predetermined display digit number of the display means is four digits, upper four digits of a computed value are displayed in the first display, and at least three lower digits of the computed value are displayed in the second display.

According to another aspect of the present invention, the electronic thermometer is an electronic clinical thermometer for measuring a body temperature, the computation means computes the body temperature in Fahrenheit five digits from a digit of 100 to a digit of 1/100, the predetermined display digit number of the display means is four digits, upper four digits of a computed value are displayed in the first display, and lower one digit of the computed value is displayed in the second display.

According to another aspect of the present invention, a display mode of the first display is different from a display mode of the second display.

According to another aspect of the present invention, the display mode of the first display is a lighting display of a body temperature, and the display mode of the second display is a blinking display of the body temperature.

According to another aspect of the present invention, the electronic thermometer includes an operation switch for outputting a measurement start signal to start a body temperature measuring operation by a predetermined operation, and operation pattern detection means for detecting whether or not the measurement start signal has a predetermined pattern, and the display is switches based on a detection result of the operation pattern detection means.

According to another aspect of the present invention, the measurement start signal to be detected by the operation pattern detection means is a signal generated during a measurement start operation by the operation switch.

According to another aspect of the present invention, the measurement start signal to be detected by the operation pattern detection means is a signal generated in a display state of the measurement result after temperature measurement.

According to another aspect of the present invention, the predetermined pattern of the measurement start signal is a pattern in which the measurement start signal continuously lasts for a predetermined time or more.

According to another aspect of the present invention, the predetermined pattern of the measurement start signal is a pattern in which a signal lasting for a predetermined time or more is continuously generated at a predetermined time interval.

According to another aspect of the present invention, the predetermined pattern of the operation signal is a pattern in which a signal lasting for a predetermined time or less is continuously generated at a predetermined time interval.

According to another aspect of the present invention, the predetermined pattern of the operation signal is a pattern in which a first signal lasting within a first range of time, and a second signal lasting within a second range of time are continuously generated at a predetermined time interval.

An object of the present invention is to provide an electronic thermometer in which without using a special display in a manufacturing process, or increasing a digit number of a display on a main body of a thermometer, it can be confirmed whether or not a value of a digit lower in order than a digit displayed as a body temperature to a measuring person is adjusted within a predetermined adjustment range. Moreover, another object of the present invention is to provide an electronic thermometer in which by using a display section with a digit number smaller than that of all information to be displayed, all the information to be displayed can be displayed.

To attain the object, the present invention comprises temperature measurement means for generating a temperature measurement signal based on a temperature of an object under temperature measurement; computation means for computing the temperature of the object based on the temperature measurement signal in a predetermined computation digit number; display means for displaying the temperature computed by the computation means in a predetermined display digit number smaller than the predetermined computation digit number; first display control means for displaying the temperature computed by the computation means from a highest digit to the predetermined display digit in the display means; and second display control means for displaying at least the temperature in a digit not displayed in the display means by the first display control means among the temperature computed by the computation means.

According to the present invention, there can be provided an electronic thermometer in which without using the special display in the manufacturing process, or increasing a digit number of a display on a main body of the thermometer, it can be confirmed whether or not the value of the digit lower in order than the digit displayed as the body temperature to the measuring person is adjusted within the predetermined adjustment range. Moreover, according to the present invention, there can be provided the electronic thermometer in which by using the display section with the digit number smaller than that of all information to be displayed, all the information to be displayed can be displayed.

BEST MODE FOR CARRYING OUT THE INVENTION

Embodiments of the present invention will be described hereinafter in detail with reference to the drawings.

Figure 1:
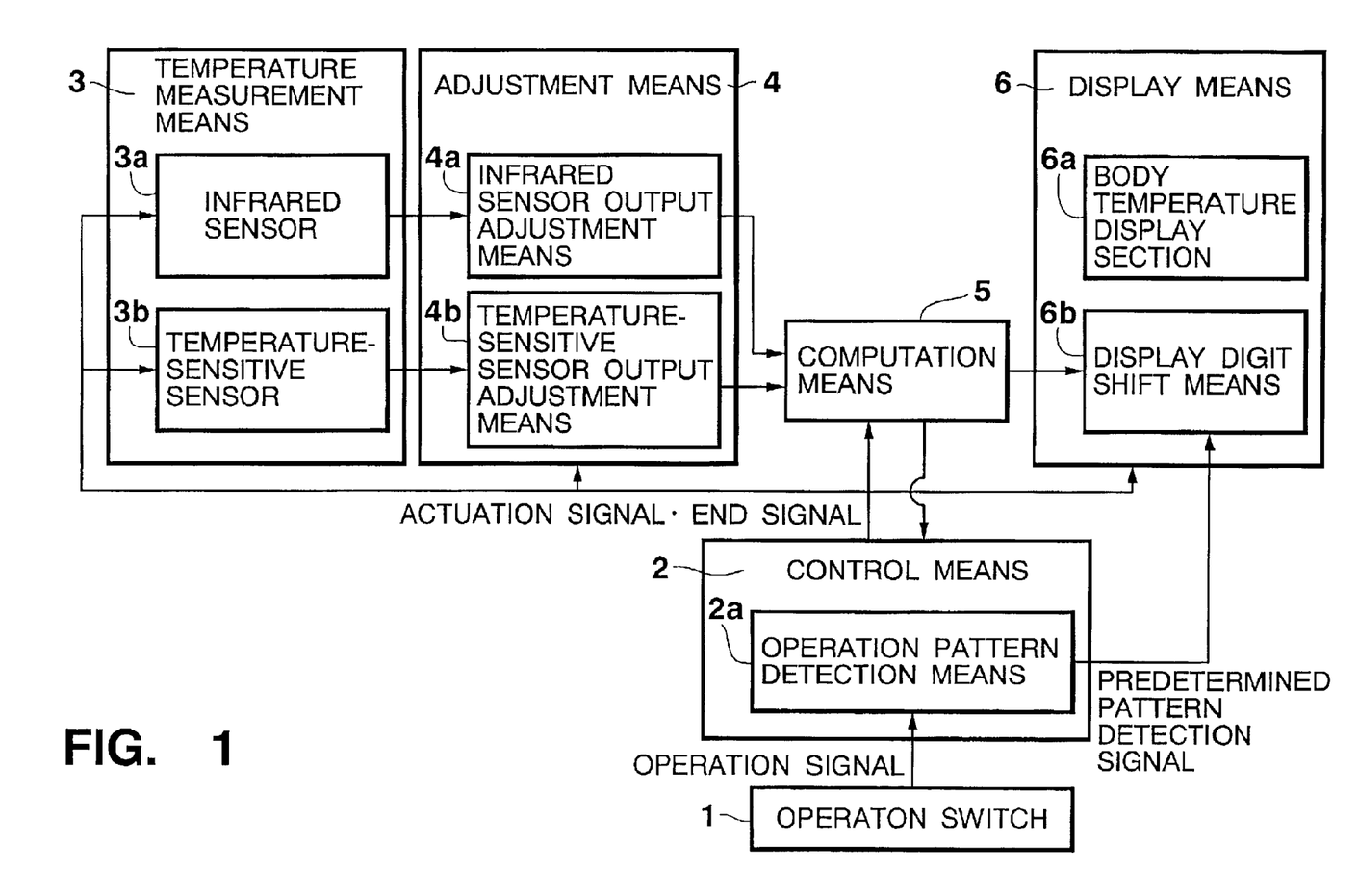
FIG. 1 is a block diagram of a clinical thermometer of emission type according to one embodiment of the present invention.
Figure 2:
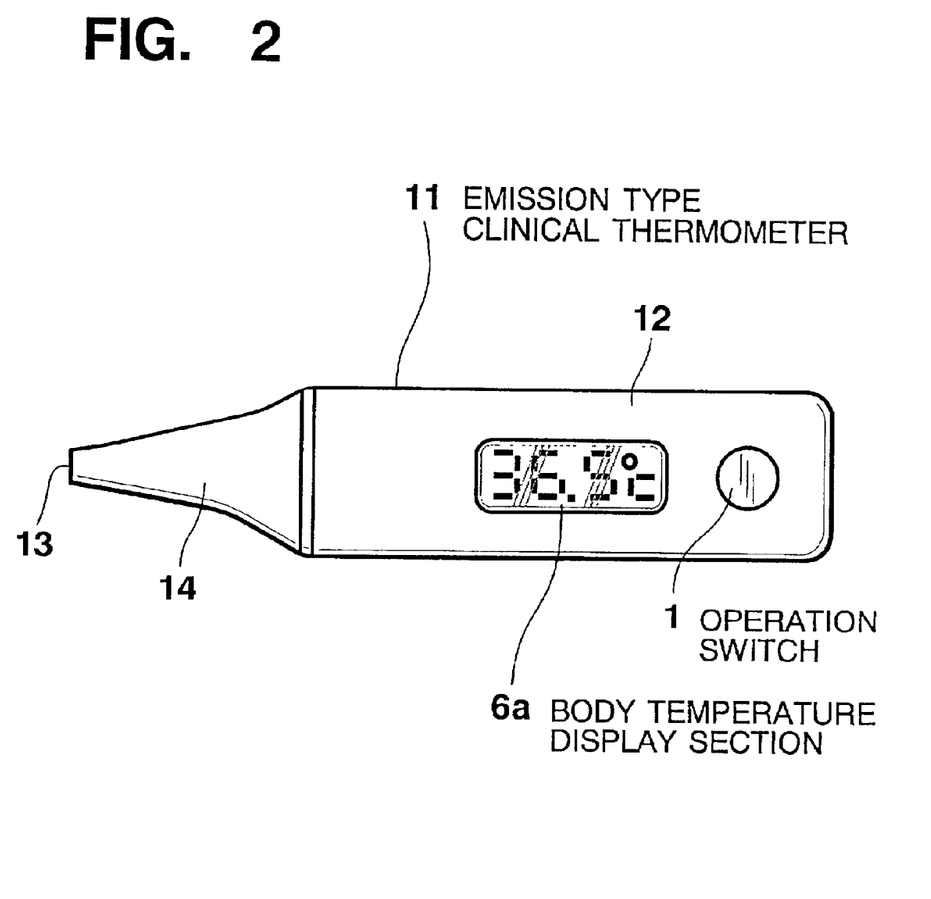
FIG. 2 is an outer appearance of the emission type clinical thermometer according to one embodiment of the present invention.

FIG. 1 is a block diagram of a clinical thermometer of emission type according to one embodiment of the present invention, and FIG. 2 is an outer appearance of the emission type clinical thermometer according to one embodiment of the present invention.

First, the outer appearance of the clinical thermometer will be described by reference to FIG. 2.

In FIG. 2, an emission type clinical thermometer 11 comprises a main body 12 and a probe section 14. The main body 12 includes an operation switch 1 as operation means and a body temperature display section 6a. The operation switch 1 is a push-button switch, and the emission type clinical thermometer 11 starts measurement of body temperature when the operation switch 1 is depressed. The body temperature display section 6a displays a measured body temperature, and comprises a liquid crystal display.

A tip of the probe section 14 has such a shape as to be inserted into an ear canal, and the tip is provided with a guide opening 13 for guiding infrared radiation from an eardrum as a measurement site into the emission type clinical thermometer 11.

The block diagram will next be described by reference to FIG. 1.

In FIG. 1, the emission type clinical thermometer comprises the operation switch 1, control means 2, temperature measurement means 3, adjustment means 4, computation means 5 and display means 6. When the operation switch 1 is depressed, the operation switch 1 generates an operation signal. The control means 2 detects generation of the operation signal, and outputs an actuation signal which is effective to actuate the temperature measurement means 3, the adjustment means 4, the computation means 5 and the display means 6. Specifically, the control means 2 functions as operation signal detection means. The control means 2 includes an operation pattern detection means 2a. The operation pattern detection means 2a outputs a predetermined pattern detection signal when detecting generation of the operation signal in a predetermined pattern which will be described later. Additionally, in this embodiment, the operation signal constitutes a measurement start signal for starting measurement of body temperature.

The temperature measurement means 3 detects an eardrum temperature as an object whose temperature is to be measured, comprises an infrared sensor 3a and temperature-sensitive sensor 3b. The infrared sensor 3a is constituted, for example, of a thermopile, and detects infrared radiation from the eardrum to output a detection signal. The temperature-sensitive sensor 3b is constituted, for example, of a thermistor, detects a temperature of the infrared sensor 3a, and outputs the detection signal.

The adjustment means 4 adjusts an output signal of the temperature measurement means 3, and is constituted of infrared sensor output adjustment means 4a and temperature-sensitive sensor output adjustment means 4b. The infrared sensor output adjustment means 4a adjusts electric characteristics such as inclination and offset of the output of the infrared sensor 3a, and the temperature-sensitive output adjustment means 4b also adjusts the electric characteristics such as the inclination and offset of the output of the temperature-sensitive sensor 3b. These two adjustment means adjust dispersions of characteristics of the infrared sensor 3a and temperature-sensitive sensor 3b to place measurement precision of the emission type clinical thermometer within a predetermined range. Setting of an adjustment value is performed by a predetermined method in a manufacturing process.

The computation means 5 computes the temperature of the temperature measurement object based on outputs of the infrared sensor output adjustment means 4a and temperature-sensitive sensor output adjustment means 4b, and outputs a signal corresponding to the value to the control means 2 and display digit shift means 6b of the display means 6 described later. The output signal of the computation means 5 is a signal indicating a four-digit value of a digit of 10 to a digit of 1/100 of the body temperature in Centigrade, and is a signal indicating a five-digit value of a digit of 100 to a digit of 1/100 of the body temperature in Fahrenheit. The control means 2 judges whether or not to end the measurement based on the signal from the computation means 5, and outputs a stop signal to end the respective means operations when judging that the measurement ends.

The display means 6 is announcement means for displaying the body temperature based on the output signal of the computation means 5, and is constituted of body temperature display section 6a and display digit shift means 6b. The display digit shift means 6b selects a predetermined digit from the output signal of the computation means 5 to output a signal to be displayed in the body temperature display section 6a, outputs a signal for usual body temperature display when no predetermined pattern detection signal is outputted from the operation pattern detection means 2a, and outputs a signal to shift the predetermined digit by one digit and display the body temperature when the predetermined pattern detection signal is outputted from the operation pattern detection means 2a.

In the first display, that is, an usual body temperature display, a value of a digit of 10 to a digit of 1/10 of the body temperature is displayed, and in the second display, that is, a shifted display, a value of a digit of 1 to a digit of 1/100 is displayed in a position where the usual value of digit of 10 to digit of 1/10 of the body temperature has been displayed. In this manner, the display digit shift means 6b is announcement digit selection means for shifting and displaying a predetermined digit value from the temperature computed by the computation means 5 to select and announce the predetermined digit value.

Figure 3A:
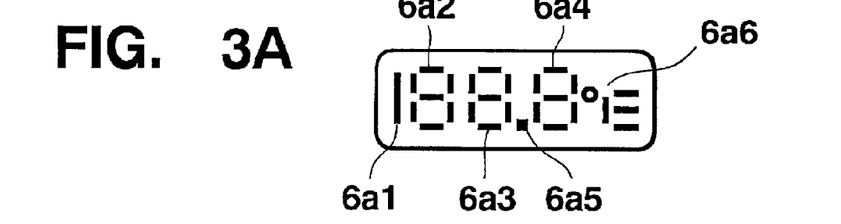
FIGS. 3(a) to (g) show examples of announcement modes of the emission type clinical thermometer according to one embodiment of the present invention.

The body temperature display section 6a comprises a liquid crystal display, and a completely lit state is shown in FIG. 3(a). In FIG. 3(a), 6a1 denotes a segment for displaying numeral "1", and each of 6a2 to 6a4 comprises seven segments forming a B-shaped letter, so that numerals "0" to "9" can be displayed. A segment 6a5 indicates a decimal point, and this example includes only one decimal point display section. Moreover, 6a6 is a segment for displaying "° C." of "° F." as a temperature unit.

A body temperature measuring method by the emission type clinical thermometer in the present embodiment, and display method of a measurement result will next be described with reference to FIGS. 2, 3 and 5.

First, usual body temperature measurement (body temperature measurement mode) will be described. A body temperature measuring operation is started first by depressing the operation switch 1 once. Subsequently, the probe section 14 is inserted into the ear canal with the guide opening 13 directed to the eardrum. Then, among the temperatures measured in accordance with predetermined conditions until the body temperature measuring operation ends, a maximum value is displayed as the body temperature in the body temperature display section 6a.

Figure 3B:
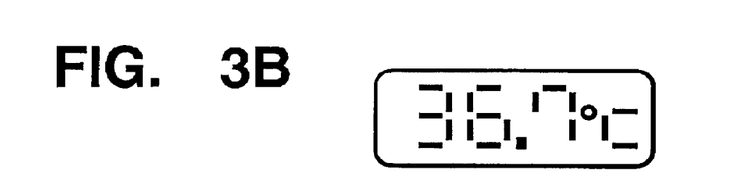

FIG. 3(b) shows an example in which a measured value Centigrade 36.74° C. is displayed in the body temperature measurement mode.

Test time (test mode) in a manufacture process will next be described.

Figures 5A, 5B:
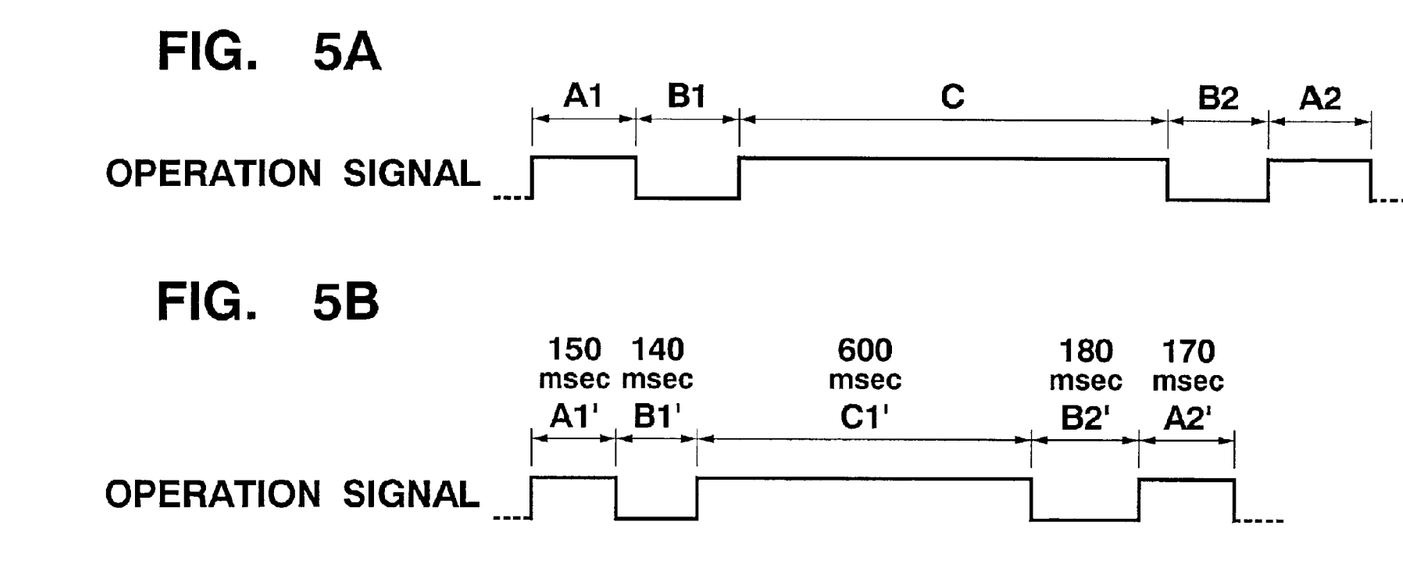
FIG. 5 is a timing chart of an operation signal according to one embodiment of the present invention, wherein (a) shows a signal of predetermined pattern, and (b) shows an example of a signal of generation pattern.

First the measurement switch 1 is operated in a predetermined pattern as shown in FIG. 5(a). In FIG. 5(a) a first signals A1, A2 indicate an operation signal whose duration is within a first range of time, that is, 105 msec to 255 msec, and a second signal C indicates an operation signal whose duration is within a second range of time longer than that of A1 or A2, that is, 525 msec to 975 msec. Moreover, B1 or B2 indicates that each of an interval between the operation signals A1 and C and an interval between the operation signals C and A2 is a predetermined time interval in a range of 105 msec to 255 msec.

In order to generate such signal, first the operation switch 1 is depressed for 105 msec to 255 msec, the operation switch 1 is then released for 105 msec to 255 msec and the operation switch 1 continues to be depressed for 525 msec to 975 msec. Subsequently, after the operation switch 1 is released again for 105 msec to 255 msec, the operation switch 1 continues to be depressed for 105 msec to 255 msec.

FIG. 5(b) shows one example of a generation pattern of the operation signal, first a signal (A1') with a duration of 150 msec is generated, and next after a time (B1') of 140 msec a signal (C1') with a duration of 600 msec is generated. Subsequently, after an interval (B2') of 180 msec a signal (A2') of 170 msec is generated.

A pattern in which A1, C, A2 are continuous at a predetermined interval as shown in FIG. 5(a) fails to be generated unless a usual user consciously performs operation, and the test mode is prevented from being incorrectly obtained except the test of the manufacture process.

When the operation signal is generated as shown in FIG. 5(a), by the operation signal generated in the first period A1 the emission clinical thermometer 11 starts its body temperature measuring operation, and the test mode is obtained at the end of the signal A2. Subsequently, the introductory port 13 is directed to the temperature measurement object for the test of 36.75° C. to measure the temperature of the temperature measurement object. When the measurement ends in accordance with the predetermined conditions, among the temperatures measured from the start till the end of the measurement, the maximum value is displayed as the temperature of the temperature measurement object. In the test mode, the display digit shift means 6b shifts the measurement result by one digit to display the result.

According to this example, the predetermined pattern for performing the second display, that is, the shift display in the test mode is placed in an operation pattern in which the usual user fails to easily perform the operation. Specifically, in the predetermined pattern of the operation signal, the first signals A1, A2 indicating that the operation signal lasts in the first range of time, and the second signal C indicating that the operation signal lasts in the second range of time are continuously generated at the predetermined time interval B1, B2. Therefore, there is an effect that the usual user cannot easily recognize the shift display.

Figure 3C:
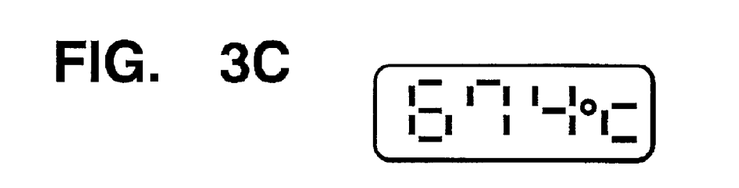

FIG. 3(c) shows an example in which the measured value centigrade 36.74° C. is displayed in the test mode. Without displaying "3" as the value of digit of 10 of the body temperature or the decimal point, the value of digit of 1 to digit of 1/100 of the body temperature is shifted toward an upper digit by one digit, display is performed using seven segments of 6a2 to 6a4 shown in FIG. 3(a), and all the segments displayed in the body temperature display section 6a are blinked to indicate the test mode. In this case, since no decimal point is displayed, the decimal point is effectively prevented from being displayed in an incorrect position. Since the temperature of the temperature measurement object is 36.74° C., and the value of digit of 1/100 of the body temperature is to be adjusted, it is clear that the value of digit of 10 of the body temperature is "3" even if not displayed.

Moreover, for example, when a measurable range is set to 33.00° C. to 42.00° C., that is, less than 10° C., and even when the temperature of the object to be temperature measured is not known, the measurement result can be distinguished as 33.75° C. with "375° C." being displayed, and distinguished as 41.75° C. with "175° C." being displayed by reference to "3" and "1" displayed on the value as displayed in a shifted manner.

In this example, the display is lighted during the first display, that is, the usual display, and the display is blinking during the second display, that is, the shifted display, so that the first display differs from the second display in the display mode. Therefore, according to this example, the usual display can effectively be distinguished more easily from the shifted display.

Moreover, according to this example, since lower three digits of the body temperature as the computation result are displayed as the second display, the digit of 1/100 can be displayed in a necessary minimum display pattern by the electronic clinical thermometer of Centigrade display type.

The body temperature measuring method and the display method of measurement result have been described above, but the display of body temperature can be switched between Centigrade and Fahrenheit by switching means (not shown). In the Centigrade display, predetermined three digits 6a2 to 6a4 of FIG. 3(a) are used to display the body temperature, while in the Fahrenheit display predetermined four digits 6a1 to 6a4 are used to display the body temperature. A Fahrenheit display method will be described hereinafter.

Figure 3D:
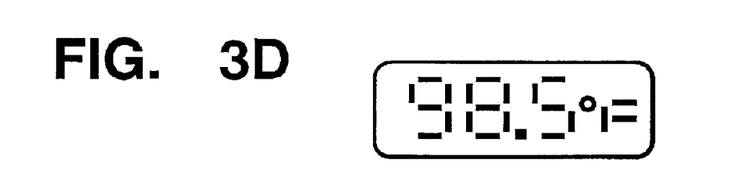
Figure 3E:
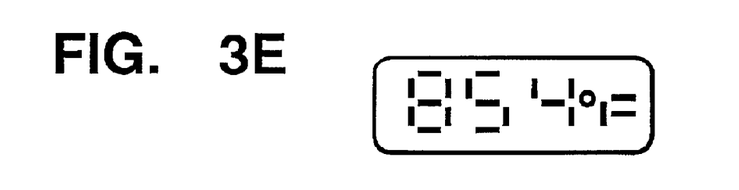

FIG. 3(d) shows an example in which Fahrenheit 98.54° F. is displayed as a measurement result in the body temperature measurement mode, and FIG. 3(e) shows an example in which Fahrenheit 98.54° F. is displayed as a measurement result in the test mode.

In the body temperature measurement mode, the segments 6a2 to 6a4 are used to display the value of digit of 10 to digit of 1/10. On the other hand, in the test mode, without displaying the value of digit of 10 and the decimal point, the value of digit of 1 to digit of 1/100 is shifted to the upper digit by one digit to display the result in the segments 6a2 to 6a4, and the shifted digit and unit are displayed in a blinking manner.

Figure 3F:
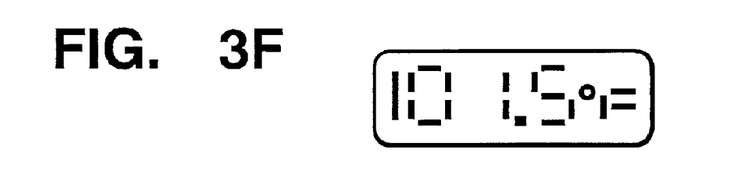
Figure 3G:
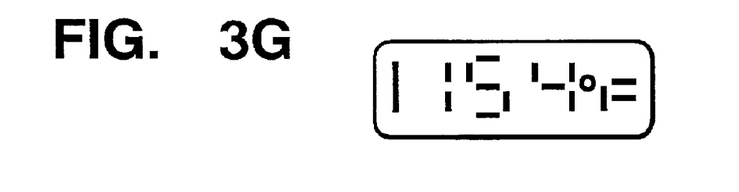

FIG. 3(f) shows an example in which Fahrenheit 101.54° F. is displayed in the body temperature measurement mode, and FIG. 3(g) shows an example in which Fahrenheit 101.54° F. is displayed in the test mode.

In the body temperature measurement mode, the segments 6a1 to 6a4 are used to display the value of digit of 100 to digit of 1/10. On the other hand, in the test mode, by displaying the value of digit of 100 as it is, and without displaying the value of digit of 10 and the decimal point, the value of digit of 1 to the digit of 1/100 is shifted to the upper digit by one digit to display the result using the segments 6a1 to 6a4 of FIG. 3(a), and the shifted digit value and unit ° F. are displayed in a blinking manner.

For example, when the temperature of the object under measurement is not known, and if the value is shifted without leaving the value of digit of 100, either Fahrenheit 91.54° F. as a measurement result or 101.54° F. as a measurement result is displayed as "154° F.", and no difference cannot be seen. However, when the shift display is performed by leaving the value of digit of 100, 101.54° F. is displayed as "1154° F.", and for the measurement result Fahrenheit, it is possible to distinguish between 91.54° F. and 101.54° F. This is effective when test is performed using test objects of two temperatures such as 91.54° F. and 101.54° F.

Moreover, when the measurement range, that is, the value outputted by the computation means 5 is set in a range of Fahrenheit 90.00° F. to Fahrenheit 109.99° F., by leaving a value of the 100th digit if it is 1, for the measurement result, it is possible to distinguish between a temperature of Fahrenheit 100° F. or more and a temperature of less than Fahrenheit 100° F.

Moreover, in FIG. 3(g), the value of the shifted digit (digit of 1 to digit of 1/100) and unit are displayed in a blinking manner, but the entire body temperature display section 6a may be blinked. If at least a part of the body temperature display section 6a is blinked, the test mode can be confirmed.

In this manner, in the example, with the Centigrade display, the computation means 5 computes the body temperature with Centigrade four digits of digit of 10 to digit of 1/100, displays upper three digits among the Centigrade four digits in the first display, and displays lower three digits among the Centigrade four digits in the second display. With the Fahrenheit display, the computation means 5 computes the body temperature with Fahrenheit five digits of digit of 100 to digit of 1/100, displays the upper four digits among the Fahrenheit five digits in the first display, and displays the upper one digit and lower three digits among the Fahrenheit four digits in the second display.

According to this example, since the upper one digit and lower three digits of the body temperature as the computation result are displayed as the second display, the digit of 1/100 can be displayed in the necessary minimum display pattern with the electronic clinical thermometer of Fahrenheit display type.

Moreover, according to this example, since the operation switch for starting the body temperature measurement also generates the signal for performing the second display, it is unnecessary to dispose an independent switch exclusive for the digit shifting, that is, the second display, and both the temperature measuring operation and the digit shift operation are possible with a single switch.

An operation of the emission type clinical thermometer 11 will next be described with reference to the block diagram of FIG. 1 and the flowchart of FIG. 4.

Figure 4:
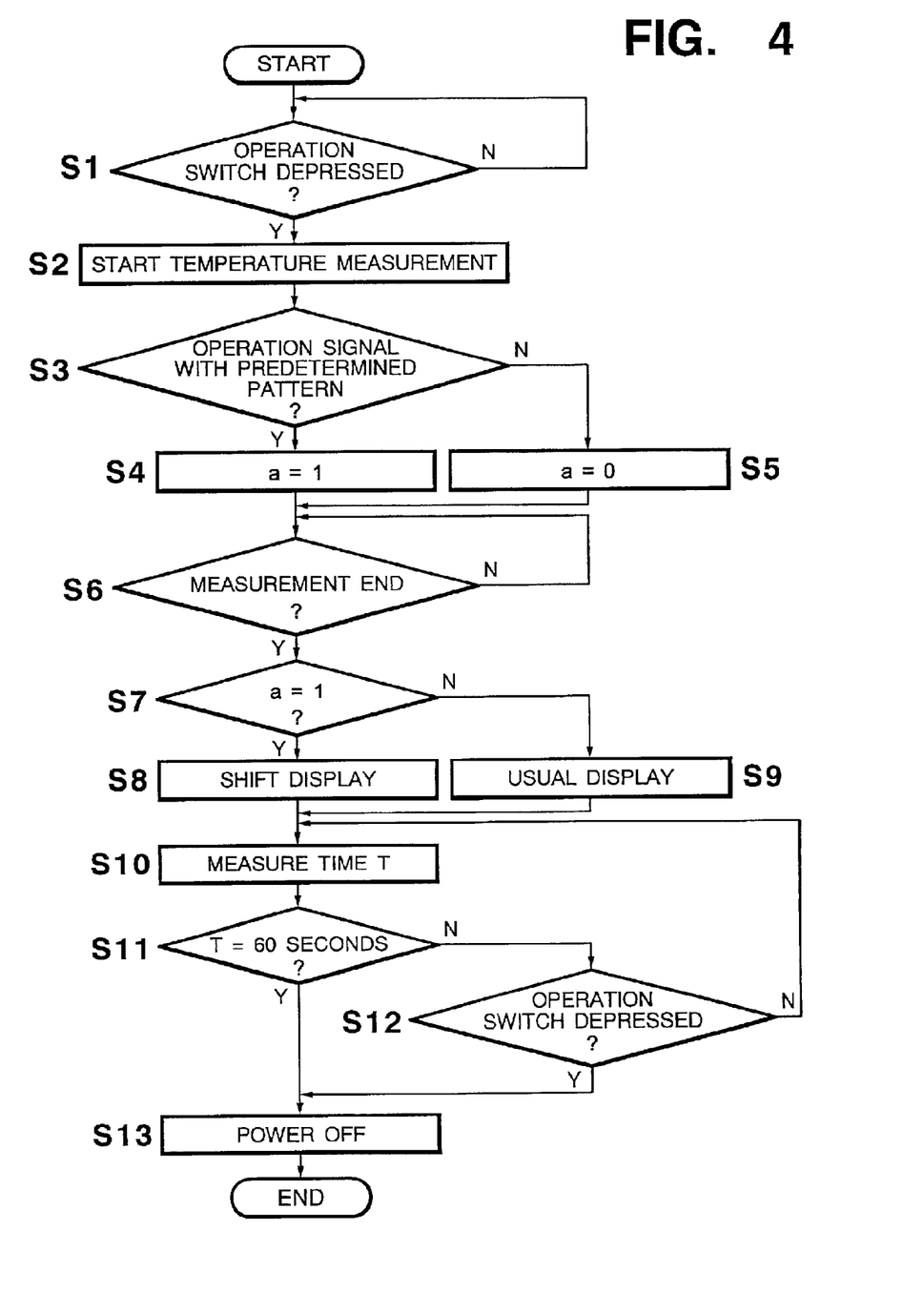
FIG. 4 is a flowchart of the emission type clinical thermometer according to one embodiment of the present invention.

In FIG. 4, symbols S1 to S13 indicate respective processing steps.

First in S1, the control means 2 detects whether or not the operation switch 1 is depressed, that is, whether or not the operation signal is generated. When the generation of the operation signal is detected, flow advances to S2. When the generation is not detected, the processing of S1 is performed again.

In S2 the control means 2 outputs the actuation signal, and actuates the temperature measurement means 3, adjustment means 4, computation means 5, and display means 6 to start measurement. The measuring operation is performed in a predetermined cycle, and continued until it is judged in S6 which will be described later that the measurement ends.

In S3 the operation pattern detection means 2a detects that the operation pattern is outputted in the pattern of FIG. 5(a). When the predetermined pattern is detected, the detection signal is outputted to the display digit shift means 6b and a shift flag "a" (not shown) of the display digit shift means 6b is set to "1". When the predetermined pattern is not detected, no detection signal is outputted, and the shift flag "a" remains to be "0". In either case, the flow advances to S6.

In S6 the control means 2 judges whether or not to end the measuring operation based on the output from the computation means 5, that is, body temperature computation data. When the control means 2 judges that the measuring operation has ended, the control means 2 outputs an end signal to the temperature measurement means 3, adjustment means 4, and computation means 5. When the end of the measuring operation is not judged, the judgment of S6 is performed again. The operations of the temperature measurement means 3, adjustment means 4, and computation means 5 are stopped by the end signal, but the display means 6 announces the measured temperature after the end of measurement and therefore stops its operations after an elapse of a predetermined time.

In S7 the display digit shift means 6b confirms that the shift flag "a" is "1" or "0". When the shift flag a is not "1", in S9 the display digit shift means 6b outputs a signal for displaying the body temperature in the usual mode without shifting the digit to the body temperature display section 6a, and the body temperature display section 6a displays the body temperature as the first display in the usual mode. When the shift flag a is "1", in S8 the display digit shift means 6b outputs a signal for shifting and displaying the body temperature to the body temperature display section 6a, and the body temperature display section 6a shifts the body temperature by one digit and displays the second display as described above.

Subsequently, in S10 the control means 2 starts measurement of time T. When it is judged in S11 that the time T reaches 60 seconds, in S13 the control means 2 stops the operation of the display mean 6 and automatically turns off power.

Moreover, when the time T fails to reach 60 seconds in S11, and the depression of the operation switch 1 is detected in S12, the control means 2 stops the operation of the display means 6 and turns off the power.

Specifically, in the example the display digit shift means 6b selects either the first display or the second display to perform the display.

According to the example, since the predetermined pattern is detected at the beginning of measurement, the start of measurement and selection of shifting or non-shifting can be performed by one operation, and time is shortened in the test or the like.

The operation of the emission type clinical thermometer according to the present embodiment has been described above, but the temperature measurement of S2 of FIG. 4 may be performed, for example, after the predetermined pattern is detected in S3.

In this embodiment, switching between the Centigrade display and the Fahrenheit display is possible in the embodiment, but the body temperature may be displayed in either Centigrade or Fahrenheit. For example, when the body temperature is displayed only in Centigrade, the segment 6a1 of FIG. 3(a) is erased and the segment 6a6 may be constituted as "° C.". Moreover, when the body temperature is displayed only in Fahrenheit, the segment 6a6 of FIG. 3(a) may be constituted as "° F.". Alternatively, when the body temperature is displayed only in Fahrenheit, the display segment 6a1 exclusive for numeral "1" of FIG. 3(a) may be constituted of seven segments of B-shaped letter like the segments 6a2 to 6a4 and the segment 6a6 may be constituted as "° F.", and in the second display the lower four digits may be displayed using the segments 6a1 to 6a4.

Another embodiment of the present invention will next be described.

Figure 6A:
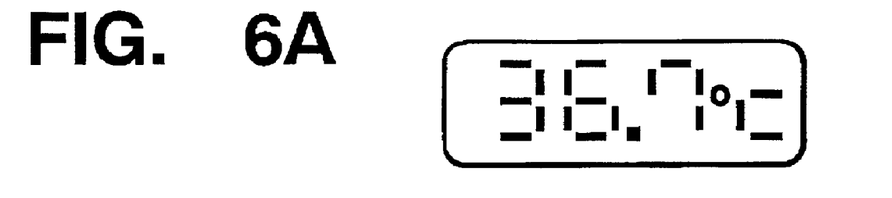
FIGS. 6(a) and (b) show one example of a display in another embodiment of the present invention.
Figure 6B:
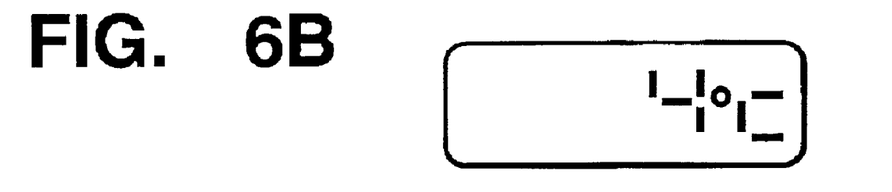

In the present embodiment, when the measured temperature is displayed in the test mode, the first display as the usual display and the second display as the shifted display are alternately performed. Specifically, for example, when the measured temperature is 36.74° C., upper three digits are first displayed as shown in FIG. 6(a), the lowest digit which has not been displayed in FIG. 6(a) is then displayed as shown in FIG. 6(b), and alternate display of FIG. 6(a) and FIG. 6(b) is continuously performed.

In this manner, in this example, with the Centigrade display, the computation means 5 computes the body temperature in Centigrade four digits of digit of 10 to digit of 1/100, displays upper three digits among the Centigrade four digits in the first display, and displays lower one digit among the Centigrade four digits in the second display. With the Fahrenheit display, the computation means 5 computes the body temperature in Fahrenheit five digits of digit of 100 to digit of 1/100, displays upper four digits among the Fahrenheit five digits in the first display, and displays lower one digit among the Fahrenheit four digits in the second display.

According to this example, for the electronic clinical thermometer of Centigrade display type, since the lowest digit of the body temperature as the computation result is displayed as the second display, the digit of 1/100 can be displayed in a necessary minimum display pattern.

Moreover, according to this example, for the electronic clinical thermometer of Fahrenheit display type, since the lowest digit of the body temperature as the computation result is displayed as the second display, the digit of 1/100 can be displayed in the necessary minimum display pattern.

Here, operation of the present embodiment will be described in more detail with reference to a flowchart of FIG. 7. Additionally, in the present embodiment, since the basic constitution of the emission type clinical thermometer is similar to that of the aforementioned embodiment, description will be performed also with reference to FIGS. 1, 2 and 3.

Figure 7:
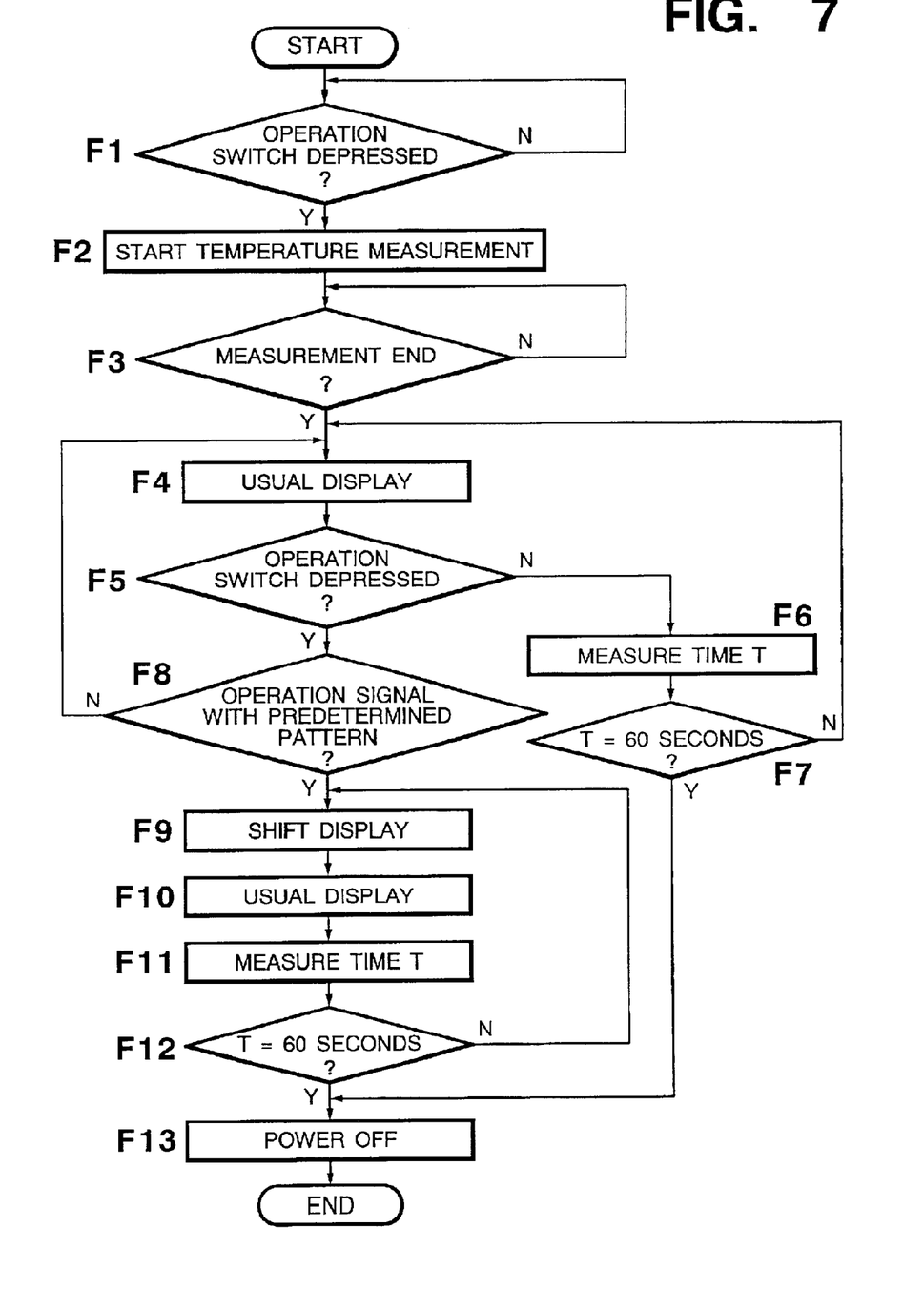
FIG. 7 is a flowchart of the emission type clinical thermometer according to another embodiment of the present invention.
Figure 8A:
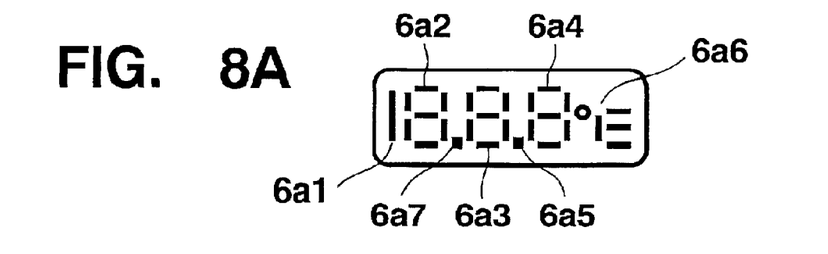
FIGS. 8(a) to (g) show examples of announcement modes of the emission clinical thermometer according to one embodiment of the present invention which are different from the examples of FIGS. 3(a) to (g)
Figure 8B:
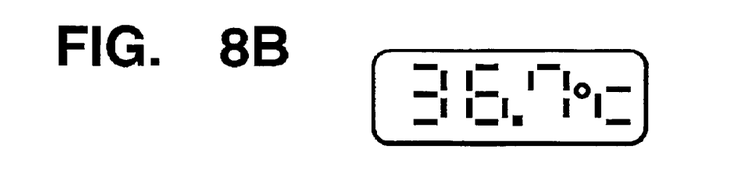
Figure 8C:
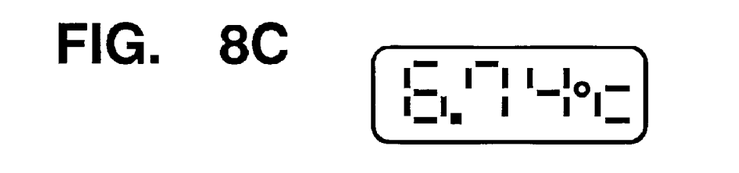
Figure 8D:
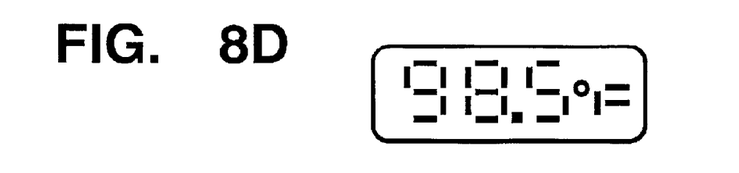
Figure 8E:
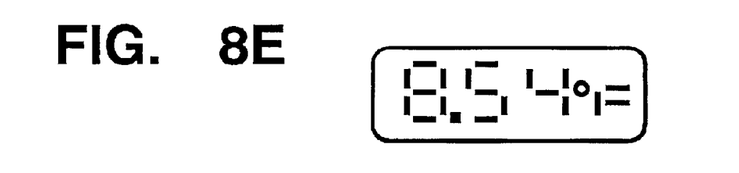
Figure 8F:
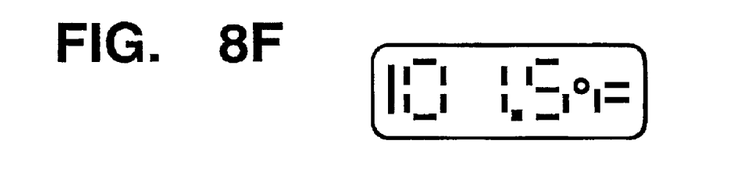
Figure 8G:
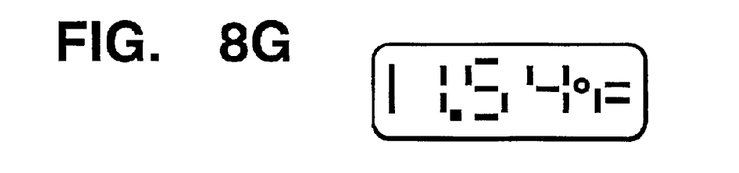

In FIG. 7, symbols F1 to F13 indicate respective processing steps.

First, in F1 the control means 2 detects whether or not the operation switch 1 is depressed, that is, whether or not the operation signal is generated. When the generation of the operation signal is detected, flow advances to F2. When the generation is not detected, the processing of F1 is performed again.

In F2 the control means 2 outputs the actuation signal, and actuates the temperature measurement means 3, adjustment means 4, computation means 5, and display means 6 to start measurement. The measuring operation is performed in the predetermined cycle, and continued until the end of measurement is judged in F3.

In F3 the control means 2 judges whether or not to end the measuring operation based on the output from the computation means 5, that is, body temperature computation data. When the control means 2 judges that the measuring operation has ended, the control means 2 outputs on end signal to the temperature measurement means 3, adjustment means 4, computation means 5, and display means 6. When the end of the measuring operation is not judged, the judgment of F3 is performed again. By the end signal, the temperature measurement means 3, adjustment means 4, and computation means 5 stop the operation.

In F4 the display digit shift means 6b outputs the signal to the body temperature display section 6a to display the body temperature in the usual mode without shifting the digit. Specifically, the value of digit of 10 to digit of 1/10 is displayed as the first display (see FIG. 6(a)).

In F5 the control means 2 again detects whether or not the operation switch 1 is depressed, that is, whether the operation signal is generated. When the generation of the operation signal is detected, flow advances to F8. When the generation is not detected, the control means 2 starts to measure time T (step F6). When it is judged in F7 that the time T reaches 60 seconds, in F13 the control means 2 stops the operation of the display means 6, and automatically turns off power. When the time T fails to reach 60 seconds in FIG. 7, the flow returns to F4.

In F8 the operation pattern detection means 2a detects that the operation pattern is outputted in the pattern of FIG. 5(a). When the operation pattern is not a predetermined pattern in F8, flow returns to F4.

When the predetermined pattern is detected in F8, the detection signal is outputted to the display digit shift means 6b, the display digit shift means 6b having received this signal outputs the signal to the body temperature display section 6a to shift and display the body temperature, and the body temperature display section 6a shifts the body temperature by one digit and changes the value from the value of digit of 10 to digit of 1/10 to the value to digit of 1/100 to display the second display, for example, as shown in FIG. 6(b) (step F9). In this case, during the shift display the display may be blinked.

Thereafter, the display digit shift means 6b outputs the signal to the body temperature display section 6a to display the body temperature in the usual mode without shifting the digit, and displays the first display as shown in FIG. 6(a) (step F10).

Subsequently, in F11 the control means 2 starts to measure the time T. When it is judged in F12 that the time T reaches 60 seconds, in F13 the control means 2 stops the operation of the display means 6, and automatically turns off the power. Moreover, when the time T fails to reach 60 seconds in F12, flow returns to F9 to continue the alternate display.

Specifically, the display digit shift means 6*b* alternately switches and displays the first and second displays.

In this manner the display digit shift means 6*b* is display control means for performing first display control to display the upper digit of the four-digit temperature computed by the computation means 5 to the digit which can be displayed with a predetermined display digit (digit of 10 to digit of 1/10) in the body temperature display section 6*a* of the display means 6, and second display control to display at least the digit (digit of 1/100) which fails to be displayed by the first display control with respect to the temperature computed by the computation means 5 in the body temperature display section 6*a* of the display means 6.

According to this example, since the predetermined pattern is detected during display of the measurement result, that is, in the measurement result display state after the temperature measurement, a switching operation between the usual display and the shift display can be performed after display of the measured temperature.

Next, FIG. 8 shows an example of the body temperature display section 6*a* in the emission type clinical thermometer according to the present invention, and which is different from the example of FIG. 3.

In this example, as shown in FIG. 8(*a*), a segment 6*a*7 is newly disposed in addition to the segments 6*a*1 to 6*a*6 shown in FIG. 3(*a*). This segment 6*a*7 is intended to indicate the decimal point. Specifically, this example is provided with a plurality of decimal point display sections.

FIG. 8(*b*) shows an example in which Centigrade 36.74° C. as a measured value is displayed in the aforementioned body temperature measurement mode, FIG. 8(*c*) shows an example in which Centigrade 36.74° C. as a measured value is displayed in the aforementioned test mode, FIG. 8(*d*) shows an example in which Fahrenheit 98.54° F. as a measurement result is displayed in the body temperature measurement mode, FIG. 8(*e*) shows an example in which Fahrenheit 98.54° F. as a measurement result is displayed in the test mode, FIG. 8(*f*) shows an example in which Fahrenheit 101.54° F. is displayed in the body temperature measurement mode, and FIG. 8(*g*) shows an example in which Fahrenheit 101.54° F. is displayed in the test mode.

With the display of FIGS. 8(*c*), (*e*) and (*g*), a blinking display is performed similarly to FIGS. 3(*c*), (*e*) and (*g*). Specifically, in FIG. 8(*c*) or FIG. 8(*e*) the displayed segments including the decimal point are all blinked, and in FIG. 8(*g*) the value of the shifted digit (digit of 1 to digit of 1/100), unit and decimal point are blinked.

Moreover, also in this example, the display digit shift means 6*b* selects and displays either the usual display as the first display or the shift display as the second display.

According to this example, as shown in FIGS. 8(*c*), (*e*) and (*g*), since the decimal point is displayed even in the test mode, the user can more easily recognize the displayed temperature.

Additionally, in the above description, the example for performing the alternate display has been described with reference to the flowchart of FIG. 7 and display examples of FIGS. 6(*a*) and 6(*b*), but the present invention is not limited to this, the display is performed, for example, in the steps F4 and F10 of FIG. 7 as shown in FIGS. 3(*b*), (*d*) and (*f*), FIGS. 8(*b*), (*d*) and (*f*), and the display may be performed in the step F9 of FIG. 7 as shown in FIGS. 3(*c*), (*e*) and (*g*), FIGS. 8(*c*), (*e*) and (*g*).

Additionally, in the aforementioned ordinary clinical thermometer and women's clinical thermometer, the number of digits necessary for the display differs in the usual use and the special use, and in either use the thermometer needs to be readily usable by general users. Here, an operating method of the operation switch 1 shown in FIG. 2 in such cases will be described.

In the aforementioned respective embodiments, the body temperature measurement mode corresponds to the usual use (e.g., measurement as the general clinical thermometer), and the test mode corresponds to the special use (e.g., measurement as the women's clinical thermometer).

In the aforementioned respective embodiments, since the general users do not use the test mode, the operation of the operation switch 1 for the test mode needs to be performed in a pattern not easily operated by the general users as shown in FIG. 5(*a*). However, since the special use herein is untended to be operated by the general users, the operating method which is easy to handle is preferable.

Figures 9A, 9B, 9C:
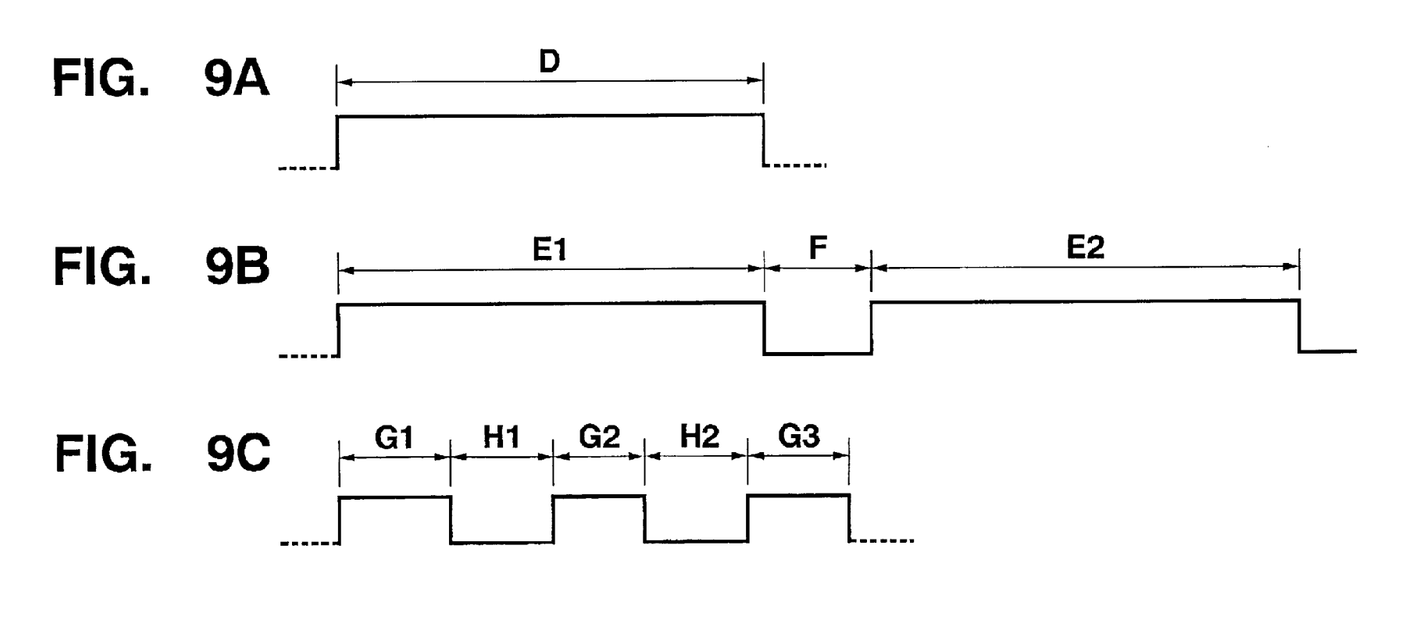
FIG. 9 is a timing chart of an operation signal according to one embodiment of the present invention which are different from the examples of FIGS. 5(a), (b).

FIG. 9(*a*) is a timing chart showing the pattern of the operation signal generated by the operation switch 1 for allowing the display section 6*a* to perform the display for the special use.

In FIG. 9(*a*), an operation signal D has duration time which is, for example, two seconds or more, and this pattern is a predetermined pattern for performing the display for the special use. By such simple pattern of operation, the general users can easily perform the operation.

In this example, the predetermined pattern for performing the second display is set to a simple operation pattern. Specifically, the predetermined pattern of the measurement start signal is used as the pattern (signal D) in which the measurement start signal continuously lasts for a predetermined time or more, and even the general users can easily operate the shifted display.

Additionally, like the operation pattern shown in FIG. 5(*a*), there are examples shown in FIGS. 9(*b*) and 9(*c*) as the example of the predetermined pattern which may not be used by the general users to perform the operation.

In FIG. 9(*b*), each of operation signals E1 and E2 has duration time which is, for example, 2 seconds±0.5 second, an interval between the operation signals E1 and E2 is, for example, 0.5 second±0.2 second, and this pattern is a predetermined pattern for performing the display of the test mode.

According to this example, since the predetermined pattern for performing the second display is set to the operation pattern not easily operated by the general users, that is, the signals E1 and E2 for continuously maintaining the measurement start signal for the predetermined time or more are continuously generated at a predetermined time interval F in the predetermined pattern of the measurement start signal, the general users do not easily see the shifted display.

In FIG. 9(*c*), operation signals G1, G2 and G3 have duration time of 200 msec±50 msec, respective intervals H1, H2 and H3 of the operation signals G1, G2 and G3 are, for example, in a range of 200 msec±50 msec, and this pattern constitutes another predetermined pattern for performing the display of the test mode.

According to this example, the predetermined pattern for performing the second display is set to the operation pattern which is not easily operated by the general users. Specifically, since the signals G1, G2, G3 lasting for the predetermined time or less are continuously generated at the predetermined time intervals H1, H2 in the predetermined pattern of the measurement start signal, there is an effect that the general users do not easily see the shifted display.

Additionally, in the aforementioned respective embodiments, the operation switch 1 has both functions of starting the usual body temperature measuring operation, and performing the change to the test mode, but individual operation means may be used for these functions.

Moreover, the display means is used as the announcement means, but the announcement may be realized by other announcement means such as voice.

Furthermore, the lower digit value computed by the computation means 5 is shifted to the upper digit and displayed in the body temperature display section 6a in the test mode, but, for example, the value of digit of 1 and digit of 1/10 of the computation result is selected, and only the value may be displayed in the body temperature display section 6a.

Additionally, the embodiment of the present invention has been described in connection with the emission type clinical thermometer, but the present invention is not limited to this, and can be applied to the electronic thermometers for measuring water and air temperatures, but the electronic thermometers such as the electronic clinical thermometer.

As apparent from the above description, according to the present invention, there can be provided the electronic thermometer in which the display section with the digit number less than that of all information to be displayed is used, and all the information to be displayed can be displayed.

POSSIBILITY OF INDUSTRIAL UTILIZATION

The present invention can be applied to electronic clinical thermometers such as an emission type clinical thermometer. Moreover, the present invention is not limited to this, and can be applied to electronic thermometers for measuring water and air temperatures, and electronic thermometers such as an electronic clinical thermometer.

What is claimed is:

1. An electronic thermometer comprising:
 a display device (6) for displaying a measured temperature measurement in a predetermined display digit number;
 a temperature measurement device (3) for generating a temperature measurement signal based on the temperature of an object under temperature measurement;
 a computation device (5) for computing a temperature value of a digit number larger than the predetermined display digit number to be displayed on the display device (6) on the basis of the temperature measurement signal; and
 a control device for controlling the display device to display a first temperature value portion and a second temperature value portion in such a manner that the second temperature value portion is not displayed while the first temperature value portion is displayed and vice versa;
 wherein the first temperature value portion is defined as a portion of the temperature value having a first set of predetermined digit or digits, and the second temperature value portion is defined as another portion of the temperature value having a second set of predetermined digit or digits including all remaining digit or digits other than the first predetermined digit or digits.

2. The electronic thermometer according to claim 1, wherein the second temperature value portion is defined as a portion of the temperature value having all remaining digit or digits other than the first set of predetermined digit or digits.

3. The electronic thermometer according to claim 1, wherein the first temperature value portion is defined as temperature value expanding from the highest digit down to a predetermined lower digit and the second temperature value portion is defined as a temperature value expanding from the lowest digit up to a predetermined higher digit.

4. The electronic thermometer according to claim 1, wherein the first temperature value portion and the second temperature value portion are displayed on the display device alternately.

5. The electronic thermometer according to claim 1, wherein the first portion and the second portion are selected from the same temperature value computed by the computation device and are displayed on the display device.

6. The electronic thermometer according to claim 1, wherein the first portion and the second portion are selected from different temperature values computed by the computation device and are displayed on the display device.

7. The electronic thermometer according to claim 5, wherein the control device controls the display device to display the first and the second temperature value portions for every temperature measuring operation.

8. The electronic thermometer according to claim 6, wherein the control device controls the display device to display the first or the second temperature value portions in a single temperature measuring operation.

9. The electronic thermometer according to claim 1, wherein the control device controls the display device to display one of:
 the first temperature value portion and then the second temperature value portion; and,
 the second temperature value portion and then the first temperature value portion.

10. The electronic thermometer according to claim 1, further including:
 an operation switch that the control device changes on the basis of a predetermined operation of the operation switch the display of the first temperature value portion to the second temperature value portion or vice versa.

11. The electronic thermometer according to claim 2, wherein a temperature value computed by the computation device has four digits as expressed in one of Centigrade and Fahrenheit, the first temperature value portion consisting of a portion of the temperature value of higher three digits while the second temperature value portion consists of a portion of the temperature value of the lowest fourth digit.

12. The electronic thermometer according to claim 3, wherein a temperature value computed by the computation device has four digits as expressed in one of Centigrade and Fahrenheit, the first temperature value portion consists of a portion of the temperature value of higher three digits while the second temperature value portion consists of a portion of the temperature value of lower three digits.

13. The electronic thermometer according to claim 1, wherein the control device controls the display device to take different display modes for the first and the second temperature value portions.

14. The electronic thermometer according to claim 3, wherein the temperature value computed by the computation device has a decimal point and the control device controls the display device such that the decimal point is lighted when the first temperature value portion is displayed while the decimal point is not lighted when the second temperature value portion is displayed.

15. The electronic thermometer according to claim 1, wherein the display device displays the first temperature value portion in a lighting condition while the second temperature value portion in a blinking condition.

16. The electronic thermometer according to claim 1, further including:

an operation switch for initiating temperature measurement, wherein the control device switches a display of the first temperature value portion and the second temperature value portion on the basis of an operation pattern of the operation switch.

17. The electronic thermometer according to claim 16, wherein the control device detects an operation pattern of the operation switch at a time of initiation of temperature measurement.

18. A method of measuring temperature with an electronic thermometer, the method comprising:

generating a temperature measurement signal based on the temperature of an object under temperature measurement;

computing a temperature value of a digit number larger than a predetermined display digit number to be displayed on the display device (6) on a basis of the temperature measurement signal; and controlling the display device to display a first temperature value portion and a second temperature value portion in such a manner that the second temperature value portion is not displayed while the first temperature value portion is displayed and vice versa;

wherein the first temperature value portion is defined as a portion of the temperature value having a first set of predetermined digit or digits, and the second temperature value portion is defined as another portion of the temperature value having a second set of predetermined digit or digits including all remaining digit or digits other than the first predetermined digit or digits.

* * * * *